(12) United States Patent
Zhou et al.

(10) Patent No.: US 11,382,068 B2
(45) Date of Patent: Jul. 5, 2022

(54) SEMI-PERSISTENT SCHEDULING FOR BROADCAST OR MULTICAST

(71) Applicant: QUALCOMM Incorporated, San Diego, CA (US)

(72) Inventors: Yan Zhou, San Diego, CA (US); Tao Luo, San Diego, CA (US); Juan Montojo, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 40 days.

(21) Appl. No.: 16/837,821

(22) Filed: Apr. 1, 2020

(65) Prior Publication Data

US 2020/0322921 A1    Oct. 8, 2020

Related U.S. Application Data

(60) Provisional application No. 62/829,607, filed on Apr. 4, 2019.

(51) Int. Cl.
*H04W 72/00* (2009.01)
*H04W 4/06* (2009.01)
*H04W 72/04* (2009.01)
*H04L 1/18* (2006.01)

(52) U.S. Cl.
CPC ......... *H04W 72/005* (2013.01); *H04L 1/1812* (2013.01); *H04W 4/06* (2013.01); *H04W 72/042* (2013.01)

(58) Field of Classification Search
CPC ... H04W 28/04; H04W 72/04; H04W 72/042; H04W 88/08; H04W 72/005; H04W 4/06; H04L 5/0007; H04L 1/1812

USPC .......................................... 370/329
See application file for complete search history.

(56) References Cited

U.S. PATENT DOCUMENTS

| | | | |
|---|---|---|---|
| 2011/0051651 A1* | 3/2011 | Wu | H04L 12/185 370/312 |
| 2011/0103327 A1* | 5/2011 | Lee | H04W 48/12 370/329 |
| 2011/0134824 A1* | 6/2011 | Grob | H04L 5/026 370/312 |
| 2012/0176996 A1* | 7/2012 | Kim | H04W 72/0413 370/329 |

(Continued)

FOREIGN PATENT DOCUMENTS

| | | | | |
|---|---|---|---|---|
| CN | 3 525 494 A1 * | 11/2016 | | H04W 4/08 |
| CN | 107734468 A | 2/2018 | | |
| EP | 3525494 A1 | 8/2019 | | |

OTHER PUBLICATIONS

International Search Report and Written Opinion—PCT/US2020/026403—ISA/EPO—dated Jul. 24, 2020.

*Primary Examiner* — Peter G Solinsky
*Assistant Examiner* — Sanjay K Dewan
(74) *Attorney, Agent, or Firm* — Harrity & Harrity, LLP (57) ABSTRACT

Various aspects of the present disclosure generally relate to wireless communication. In some aspects, a user equipment (UE) may receive information identifying a semi-persistent scheduling (SPS) configuration for a broadcast or multicast (broadcast/multicast) communication. The UE may receive the broadcast/multicast communication in accordance with the SPS configuration. Numerous other aspects are provided.

30 Claims, 5 Drawing Sheets

(56) References Cited

U.S. PATENT DOCUMENTS

| | | | | |
|---|---|---|---|---|
| 2012/0269137 | A1* | 10/2012 | Kang | H04L 5/0055 370/329 |
| 2012/0281566 | A1* | 11/2012 | Pelletier | H04W 76/27 370/252 |
| 2013/0114573 | A1* | 5/2013 | Suzuki | H04L 1/1887 370/336 |
| 2014/0177542 | A1* | 6/2014 | Novak | H04W 72/042 370/329 |
| 2014/0204888 | A1* | 7/2014 | Chung | H04L 1/0072 370/329 |
| 2016/0044634 | A1* | 2/2016 | Seo | H04W 72/005 370/312 |
| 2016/0205683 | A1* | 7/2016 | Quan | H04W 72/0446 370/280 |
| 2017/0026942 | A1* | 1/2017 | Vajapeyam | H04W 72/04 |
| 2017/0332350 | A1* | 11/2017 | Paredes Cabrera | H04W 72/005 |
| 2018/0026803 | A1* | 1/2018 | Fujishiro | H04L 12/189 370/312 |
| 2018/0049229 | A1* | 2/2018 | Dinan | H04L 1/1896 |
| 2018/0160445 | A1* | 6/2018 | Babaei | H04W 72/14 |
| 2019/0021085 | A1* | 1/2019 | Mochizuki | H04W 76/36 |
| 2019/0174479 | A1* | 6/2019 | Yamazaki | H04W 72/085 |
| 2019/0356455 | A1* | 11/2019 | Yang | H04W 72/0446 |
| 2020/0275474 | A1* | 8/2020 | Chen | H04L 1/08 |
| 2020/0396760 | A1* | 12/2020 | Yi | H04W 72/042 |
| 2021/0084677 | A1* | 3/2021 | Wanstedt | H04W 4/70 |
| 2021/0100001 | A1* | 4/2021 | Höglund | H04L 5/0053 |
| 2021/0282114 | A1* | 9/2021 | Liu | H04L 1/1825 |
| 2021/0410145 | A1* | 12/2021 | Khoshnevisan | H04W 72/1263 |

* cited by examiner

SEMI-PERSISTENT SCHEDULING FOR BROADCAST OR MULTICAST

CROSS-REFERENCE TO RELATED APPLICATION

This Patent Application claims priority to Provisional Patent Application No. 62/829,607, filed on Apr. 4, 2019, entitled "SEMI-PERSISTENT SCHEDULING FOR BROADCAST OR MULTICAST," and assigned to the assignee hereof. The disclosure of the prior Application is considered part of and is incorporated by reference in this Patent Application.

FIELD OF THE DISCLOSURE

Aspects of the present disclosure generally relate to wireless communication, and to techniques and apparatuses for semi-persistent scheduling for broadcast or multicast (broadcast/multicast).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving information identifying a semi-persistent scheduling (SPS) configuration for a broadcast or multicast (broadcast/multicast) communication; and receiving the broadcast/multicast communication in accordance with the SPS configuration.

In some aspects, a UE for wireless communication may include memory and one or more processors operatively coupled to the memory. The memory and the one or more processors may be configured to receive information identifying an SPS configuration for a broadcast or multicast (broadcast/multicast) communication; and receive the broadcast/multicast communication in accordance with the SPS configuration.

In some aspects, a non-transitory computer-readable medium may store one or more instructions for wireless communication. The one or more instructions, when executed by one or more processors of a user equipment, may cause the one or more processors to: receive information identifying an SPS configuration for a broadcast or multicast (broadcast/multicast) communication; and receive the broadcast/multicast communication in accordance with the SPS configuration.

In some aspects, an apparatus for wireless communication may include means for receiving information identifying an SPS configuration for a broadcast or multicast (broadcast/multicast) communication; and means for receiving the broadcast/multicast communication in accordance with the SPS configuration.

In some aspects, a method of wireless communication, performed by a base station (BS), may include transmitting, to a UE, information identifying an SPS configuration for a broadcast or multicast (broadcast/multicast) communication; and transmitting the broadcast/multicast communication in accordance with the SPS configuration.

In some aspects, a base station for wireless communication may include memory and one or more processors operatively coupled to the memory. The memory and the one or more processors may be configured to transmit, to a UE, information identifying an SPS configuration for a broadcast or multicast (broadcast/multicast) communication; and transmit the broadcast/multicast communication in accordance with the SPS configuration.

In some aspects, a non-transitory computer-readable medium may store one or more instructions for wireless communication. The one or more instructions, when executed by one or more processors of a base station, may cause the one or more processors to: transmit, to a UE, information identifying an SPS configuration for a broadcast or multicast (broadcast/multicast) communication; and transmit the broadcast/multicast communication in accordance with the SPS configuration.

In some aspects, an apparatus for wireless communication may include means for transmitting, to a UE, information identifying an SPS configuration for a broadcast or multicast (broadcast/multicast) communication; and means for transmitting the broadcast/multicast communication in accordance with the SPS configuration.

Aspects generally include a method, apparatus, system, computer program product, non-transitory computer-readable medium, user equipment, base station, wireless communication device, and processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
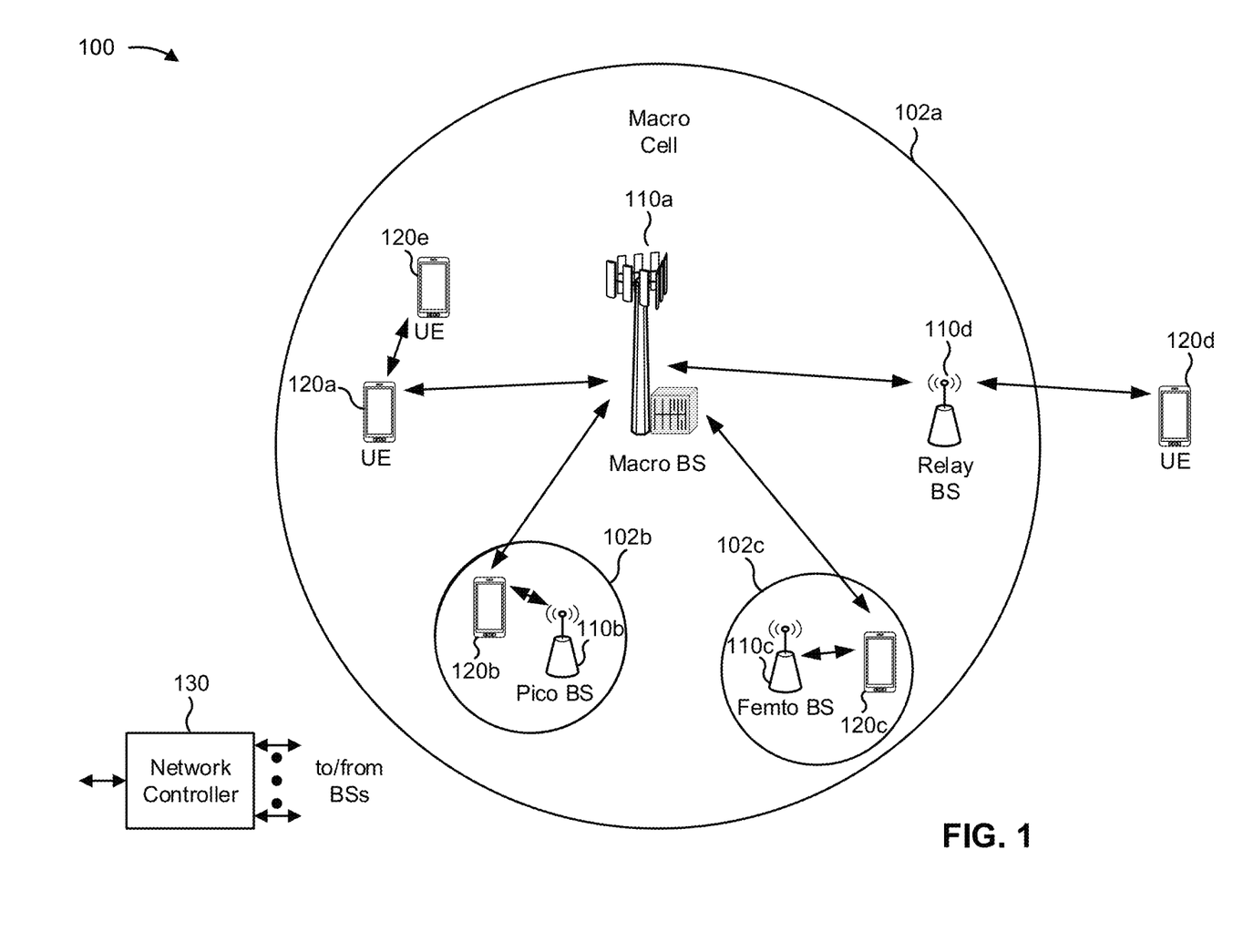
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
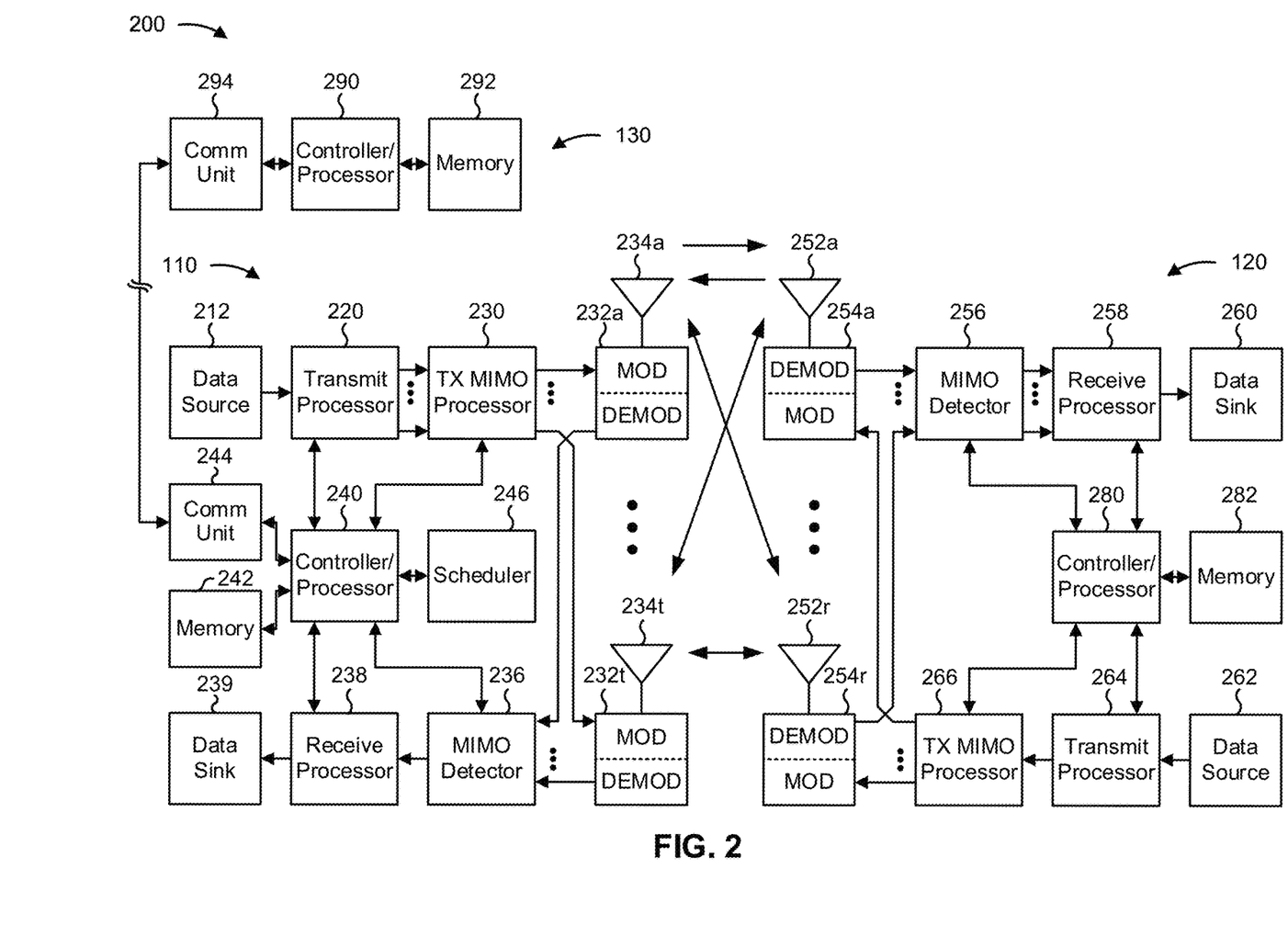
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with semi-persistent scheduling (SPS) for a broadcast or multicast (broadcast/multicast) communication, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving information identifying an SPS configuration for a broadcast/multicast communication; means for receiving the broadcast/multicast communication in accordance with the SPS configuration; means for receiving broadcast/multicast signaling regarding the SPS configuration, wherein the broadcast/multicast signaling indicates to activate, deactivate, or reconfigure the broadcast/multicast communication; means for transmitting an ACK or a NACK for the broadcast/multicast communication; means for receiving unicast signaling regarding the SPS configuration, wherein the unicast signaling indicates to activate, deactivate, or reconfigure the broadcast/multicast communication; and/or the like. In some aspects, such means may include one or more components of UE 120 described in connection with FIG. 2.

In some aspects, base station 110 may include means for transmitting, to a UE information identifying an SPS configuration for a broadcast/multicast communication; means for transmitting the broadcast/multicast communication in accordance with the SPS configuration; means for transmitting broadcast/multicast signaling regarding the SPS configuration, wherein the broadcast/multicast signaling indicates to activate, deactivate, or reconfigure the broadcast/multicast communication; means for receiving feedback regarding the broadcast/multicast communication; means for retransmitting the broadcast/multicast communication based at least in part on the feedback; means for receiving unicast signaling regarding the SPS configuration, wherein the unicast signaling indicates to activate, deactivate, or reconfigure the broadcast/multicast communication; and/or the like. In some aspects, such means may include one or more components of base station 110 described in connection with FIG. 2.

As indicated above, FIG. 2 is provided as an example. Other examples may differ from what is described with regard to FIG. 2.

Semi-persistent scheduling (SPS) may provide for the scheduling of a periodic unicast communication (e.g., an uplink communication or a downlink communication) for a UE. For example, a base station may provide configuration information identifying an SPS configuration, and the UE may transmit or receive a communication in accordance with the SPS configuration. Some networks may support multicast transmission, wherein a transmission is provided to a group of UEs, or broadcast transmission, wherein a transmission is provided to all UEs of a cell. Broadcast or multicast (broadcast/multicast) transmissions may be useful for broad dissemination of information, such as emergency alerts, audio or video content, and/or the like. Scheduling traffic using an SPS technique may be useful, since radio resources can be more effectively allocated and scheduling patterns may be more predictable. However, there may not be a mechanism for scheduling broadcast/multicast transmissions using SPS, which may lead to untenable overhead in scheduling broadcast/multicast transmissions, due to the increased volume of scheduling information to be transmitted in connection with scheduling broadcast/multicast transmissions.

Some techniques and apparatuses described herein provide SPS for broadcast/multicast transmissions. For example, some techniques and apparatuses described herein may use a cell-specific approach or a UE-specific approach for SPS configuration, activation, deactivation, reconfiguration, and so on. In some aspects, configuration parameters for receiving broadcast/multicast transmissions at different UEs may be identical across the different UEs, thus simplifying operation of the BS and improving performance of the broadcast/multicast transmission. In some aspects, the UEs may provide feedback regarding the broadcast/multicast transmission, thereby enabling the base station to selectively retransmit or reconfigure the broadcast/multicast transmission. In some aspects, configuration parameters for transmitting uplink feedback may be similar among different UEs, thereby simplifying configuration of the different UEs, or may be different among different UEs, thereby potentially improving performance of the different UEs. In this way, scheduling efficiency and performance of broadcast/multicast transmissions may be improved by using SPS.

Figure 3:
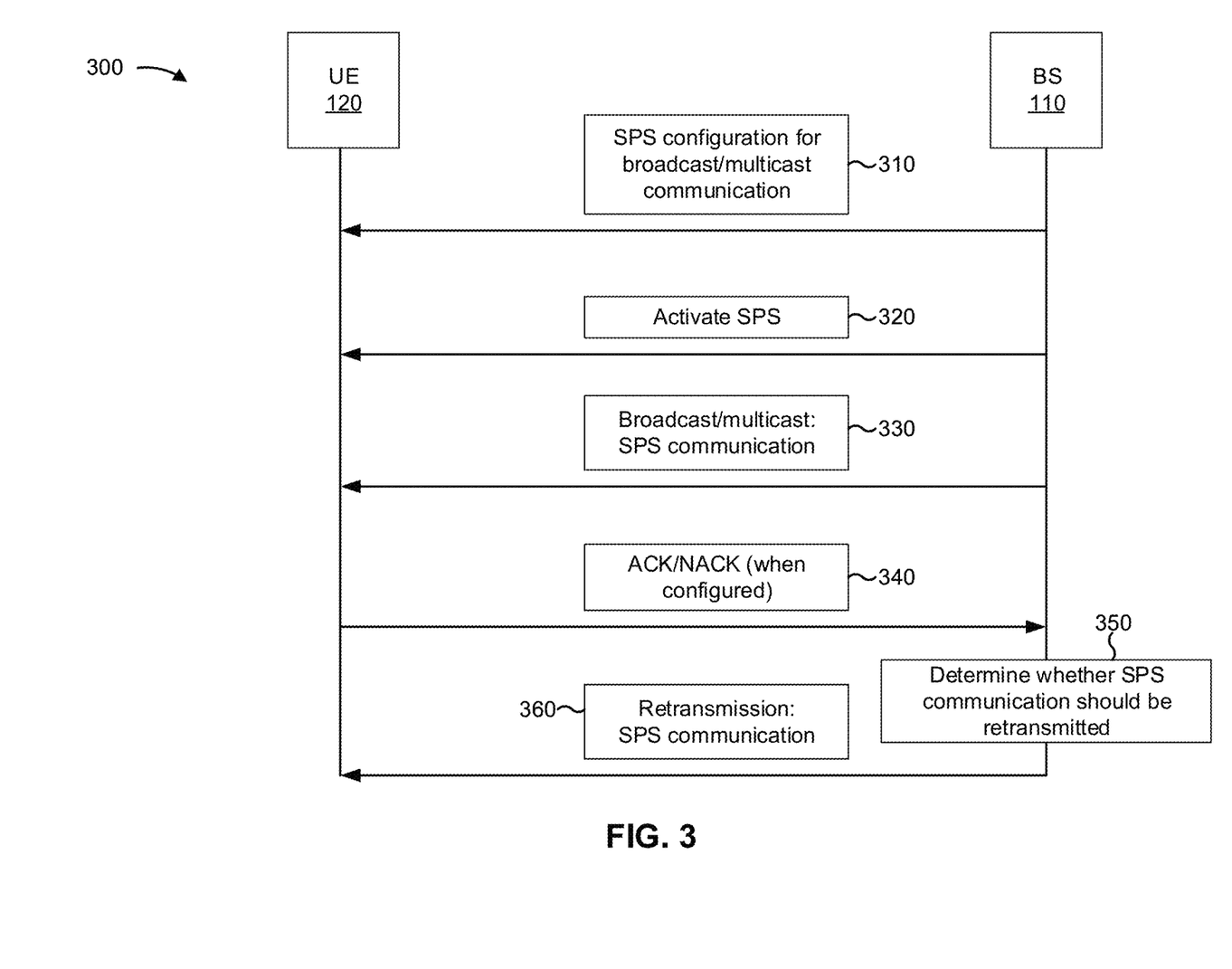
FIG. 3 is a diagram illustrating an example of semi-persistent scheduling (SPS) for a broadcast/multicast communication, in accordance with various aspects of the present disclosure.

FIG. 3 is a diagram illustrating an example 300 of SPS for a broadcast/multicast communication, in accordance with various aspects of the present disclosure. As shown, FIG. 3 includes a UE (e.g., UE 120) and a BS (e.g., BS 110). UE may be one of a plurality of UEs served by the BS that are to receive a broadcast/multicast communication.

As shown in FIG. 3, and by reference number 310, the BS may transmit, and the UE may receive, information identifying an SPS configuration for a broadcast/multicast communication. For example, the information identifying the SPS configuration may be transmitted to the UE using unicast signaling, multicast signaling, broadcast signaling, and/or the like.

In some aspects, the information identifying the SPS configuration may be transmitted to the UE using cell-specific signaling. For example, the information identifying the SPS configuration may be common to or similar for all UEs covered by the BS. In some aspects, the information identifying the SPS configuration may be transmitted to the UE using a broadcast radio resource control (RRC) message, a system information block (SIB) broadcast, and/or the like, which may conserve resources that would otherwise be used to individually signal the SPS configuration.

In some aspects, the information identifying the SPS configuration may be transmitted to the UE using UE-specific signaling, such as a dedicated downlink control information (DCI) message, a media access control (MAC) control element (CE), an RRC message, and/or the like. This may provide more granular configuration for the UEs, which may be helpful in cases wherein coverage varies for different UEs.

In some aspects, the information identifying the SPS configuration may identify a resource allocation of the broadcast/multicast communication, a periodicity of the broadcast/multicast communication, a beam configuration for the broadcast/multicast communication, a modulation and coding scheme (MCS) for the broadcast/multicast communication, a rank for the broadcast/multicast communication, a precoding matrix index for the broadcast/multicast communication, a number of hybrid automatic repeat request (HARD) processes for the broadcast/multicast communication, and/or the like. In some aspects, the information identifying the SPS configuration may identify a configuration, a resource allocation, a beam configuration, and/or the like for acknowledgment (ACK) or negative ACK (NACK) feedback. For example, the information identifying the SPS configuration may indicate whether the UE is to perform ACK/NACK feedback, NACK-only feedback, or no feedback for the broadcast/multicast communication. Providing a larger amount of feedback may enable the BS to more accurately determine whether the broadcast/multicast transmission should be retransmitted, whereas providing a smaller amount of feedback or no feedback may conserve radio resources. In some aspects, the information identifying the SPS configuration may identify a physical sequence for ACK/NACK feedback. For example, the physical sequence may be similar or identical across all UEs of the BS's cell, or may be different for different UEs of the cell.

In some aspects, the information identifying the SPS configuration may identify a common DCI or a common MAC-CE (e.g., common to UEs of the BS's cell) for broadcast activation, deactivation, reconfiguration, or retransmission of the SPS communication. In some aspects, the information identifying the SPS configuration may identify a common radio network temporary identifier (e.g., common to UEs of the BS's cell) to scramble a cyclic redundancy check (CRC) of the common DCI. In some aspects, the information identifying the SPS configuration may identify a common search space and/or a control resource set (CORESET) for the common DCI.

As shown by reference number 320, the BS may transmit, and the UE may receive, an indication to activate the SPS communication. For example, the indication may indicate that UEs covered by the BS are to receive the broadcast/multicast communication based at least in part on the SPS configuration. In some aspects, the indication may be a broadcast/multicast indication. In such a case, a CRC of the indication may be scrambled using a radio network temporary identifier that is common to UEs that are recipients of the broadcast/multicast communication. In some aspects, the indication may be a unicast or a dedicated indication. In such a case, the CRC of the indication may be scrambled using a dedicated radio network temporary identifier of the UE, or using a radio network temporary identifier common to the UEs that are recipients of the broadcast/multicast communication. As shown by reference number 330, the BS may transmit, and the UE may receive, the SPS communication. For example, the UE may receive the SPS communication in accordance with the SPS configuration.

As shown by reference number 340, in some aspects, the UE may provide feedback regarding the broadcast/multicast communication. For example, the UE may provide feedback when the SPS configuration indicates to provide the feedback. In some aspects, the UE may be configured to transmit the feedback on a common uplink resource (e.g., common to the UE and other recipients of the broadcast/multicast communication). This may conserve air interface resources and may enable the BS to determine the feedback by reference to the common uplink resource. In some aspects, the UE may be configured to transmit the feedback on a UE-specific resource, such as a respective uplink resource of the UE, which may enable the BS to determine whether particular UEs received the broadcast/multicast communication. In some aspects, a subset of UEs covered by the BS may be configured to provide feedback. For example, only UEs associated with a threshold path loss value may be configured to provide feedback, thereby conserving air interface resources that would otherwise be used to provide feedback from UEs that are likely to successfully receive the broadcast/multicast communication.

As shown by reference number 350, the BS may determine whether the broadcast/multicast communication should be retransmitted based at least in part on the feedback. For example, the BS may determine whether a threshold number of UEs reported a NACK for the broadcast/multicast communication, whether a threshold number of UEs reported an ACK for the broadcast/multicast communication, and/or the like. In this example, as shown by reference number 360, the BS retransmits the broadcast/multicast communication.

In some aspects, the BS may retransmit the broadcast/multicast communication using a next SPS occasion of the SPS configuration, which may conserve resources that would otherwise be used to schedule the broadcast/multicast communication on a different resource. In some aspects, the BS may retransmit the broadcast/multicast communication using a dynamically scheduled resource. For example, the BS may schedule the retransmission for only UEs that reported a NACK for the broadcast/multicast communication, thereby conserving resources of UEs that reported an ACK for the broadcast/multicast communication. As another example, the BS may schedule the retransmission using a common DCI (e.g., common to UEs covered by the BS) on a common search space or CORESET. In the dynamic scheduling cases described above, the scheduling information may schedule a feedback resource for the retransmission so that recipients of the retransmission can provide feedback (e.g., ACK/NACK feedback, NACK-only feedback, and/or the like) for the retransmission. In some aspects, UEs that received the broadcast/multicast communication successfully may not provide an ACK or a NACK for the retransmission, thereby conserving reporting resources.

As indicated above, FIG. 3 is provided as an example. Other examples may differ from what is described with respect to FIG. 3.

Figure 4:
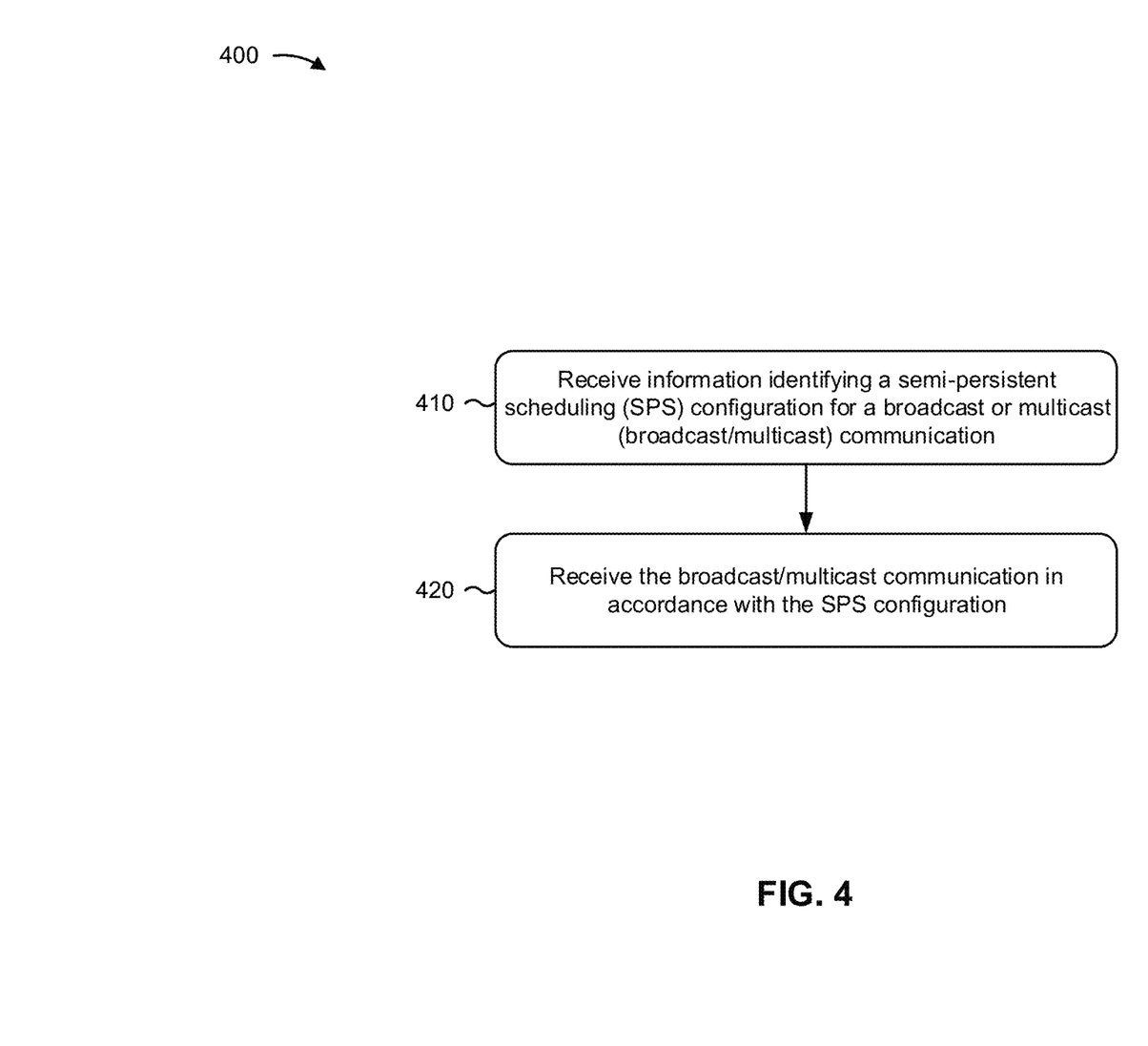
FIG. 4 is a diagram illustrating an example process performed, for example, by a user equipment, in accordance with various aspects of the present disclosure.

FIG. 4 is a diagram illustrating an example process 400 performed, for example, by a user equipment, in accordance with various aspects of the present disclosure. Example process 400 is an example where a user equipment (e.g., user equipment 120 and/or the like) performs operations associated with semi-persistent scheduling for broadcast or multicast.

As shown in FIG. 4, in some aspects, process 400 may include receiving information identifying a semi-persistent scheduling (SPS) configuration for a broadcast or multicast (broadcast/multicast) communication (block 410). For example, the user equipment (e.g., using receive processor 258, transmit processor 264, controller/processor 280, memory 282, and/or the like) may receive information identifying an SPS configuration for a broadcast/multicast communication, as described above.

As further shown in FIG. 4, in some aspects, process 400 may include receiving the broadcast/multicast communication in accordance with the SPS configuration (block 420). For example, the user equipment (e.g., using receive processor 258, transmit processor 264, controller/processor 280, memory 282, and/or the like) may receive the broadcast/multicast communication in accordance with the SPS configuration, as described above.

Process 400 may include additional aspects, such as any single implementation or any combination of aspects described below and/or in connection with one or more other processes described elsewhere herein.

In a first aspect, the SPS configuration is cell-specific.

In a second aspect, alone or in combination with the first aspect, the UE is associated with a cell, wherein the SPS configuration is used for UEs of the cell.

In a third aspect, alone or in combination with the first aspect and/or the second aspect, the SPS configuration indicates at least one of a periodicity of the broadcast/multicast communication, a modulation and coding scheme of the broadcast/multicast communication, a precoding matrix index of the broadcast/multicast communication, or a number of hybrid automatic repeat request processes of the broadcast/multicast communication.

In a fourth aspect, alone or in combination with one or more of the first through third aspects, the SPS configuration indicates a resource or a beam for the broadcast/multicast communication or for an acknowledgment or a negative acknowledgment for the broadcast/multicast communication.

In a fifth aspect, alone or in combination with one or more of the first through fourth aspects, the SPS configuration indicates a common downlink control information (DCI) or media access control (MAC) control element (CE) for activation, deactivation, reconfiguration, or retransmission of the broadcast/multicast communication.

In a sixth aspect, alone or in combination with one or more of the first through fifth aspects, the SPS configuration indicates a common radio network temporary identifier (RNTI) to be used to scramble the common DCI.

In a seventh aspect, alone or in combination with one or more of the first through sixth aspects, the SPS configuration indicates a common control resource set or a search space for the common DCI.

In an eighth aspect, alone or in combination with one or more of the first through seventh aspects, the SPS configuration is communicated using radio resource control (RRC) messaging or a system information block (SIB) broadcast.

In a ninth aspect, alone or in combination with one or more of the first through eighth aspects, the UE may receive broadcast/multicast signaling regarding the SPS configuration, wherein the broadcast/multicast signaling indicates to activate, deactivate, or reconfigure the broadcast/multicast communication.

In a tenth aspect, alone or in combination with one or more of the first through ninth aspects, the broadcast/multicast signaling is scrambled using a radio network temporary identifier associated with a group of UEs that includes the UE.

In an eleventh aspect, alone or in combination with one or more of the first through tenth aspects, the UE may transmit an acknowledgment (ACK) or a negative ACK (NACK) for the broadcast/multicast communication.

In a twelfth aspect, alone or in combination with one or more of the first through eleventh aspects, the ACK or the NACK uses a same physical sequence for each UE of a group of UEs that includes the UE.

In a thirteenth aspect, alone or in combination with one or more of the first through twelfth aspects, the SPS configuration is UE-specific.

In a fourteenth aspect, alone or in combination with one or more of the first through thirteenth aspects, the SPS configuration is communicated using dedicated downlink control information, a dedicated MAC CE, or a dedicated RRC message.

In a fifteenth aspect, alone or in combination with one or more of the first through fourteenth aspects, the SPS configuration for multiple UEs uses a same downlink reception parameter for the multiple UEs.

In a sixteenth aspect, alone or in combination with one or more of the first through fifteenth aspects, the SPS configuration identifies an uplink feedback configuration that is UE-specific.

In a seventeenth aspect, alone or in combination with one or more of the first through sixteenth aspects, the UE may receive unicast signaling regarding the SPS configuration, wherein the unicast signaling indicates to activate, deactivate, or reconfigure the broadcast/multicast communication.

In an eighteenth aspect, alone or in combination with one or more of the first through seventeenth aspects, the unicast signaling is scrambled using a dedicated radio network temporary identifier of the UE.

In a nineteenth aspect, alone or in combination with one or more of the first through eighteenth aspects, the SPS configuration identifies an uplink feedback configuration that is cell-specific.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
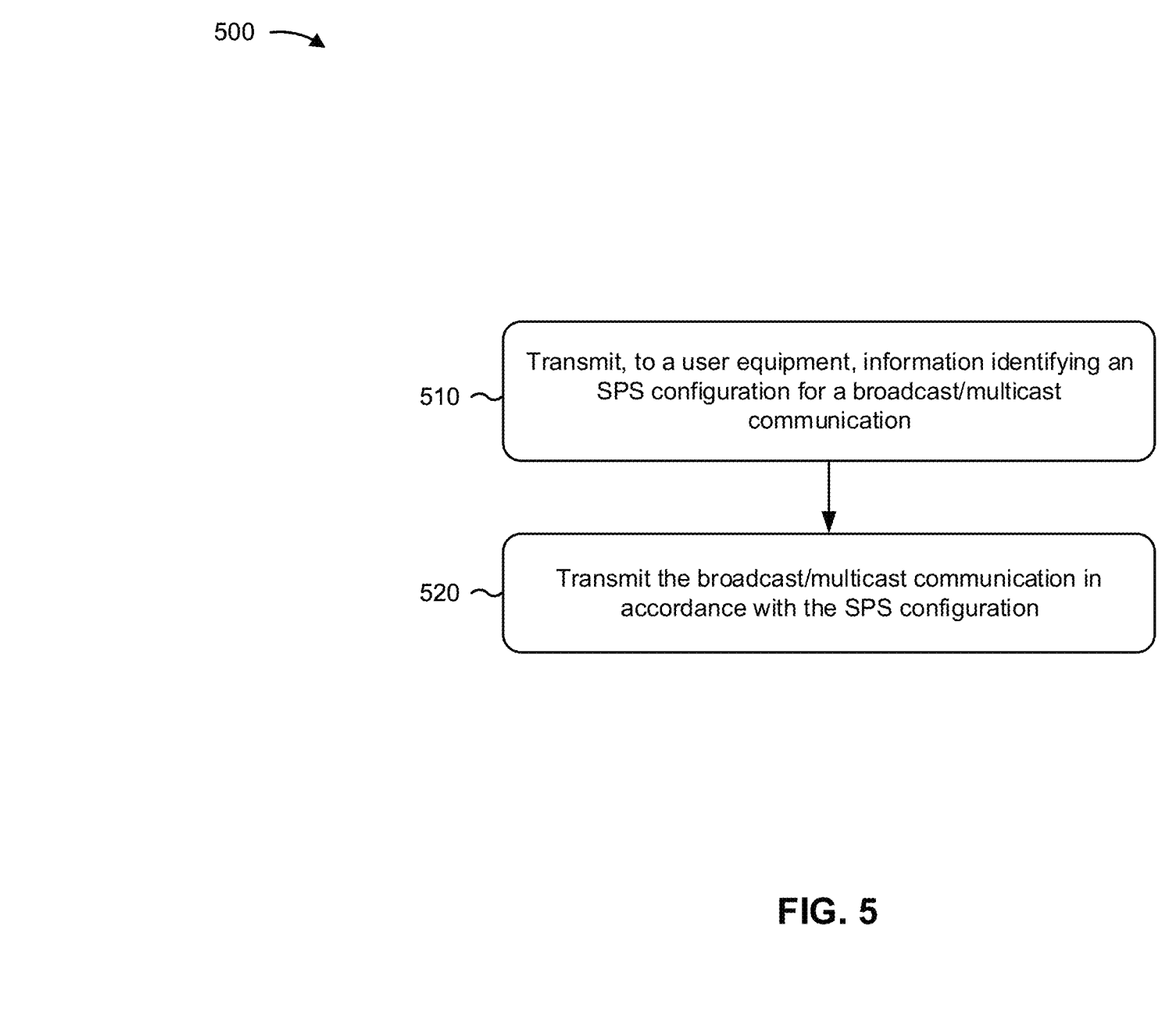
FIG. 5 is a diagram illustrating an example process performed, for example, by a base station, in accordance with various aspects of the present disclosure.

FIG. 5 is a diagram illustrating an example process 500 performed, for example, by a base station, in accordance with various aspects of the present disclosure. Example process 500 is an example where a base station (e.g., base station 110 and/or the like) performs operations associated with semi-persistent scheduling for broadcast or multicast.

As shown in FIG. 5, in some aspects, process 500 may include transmitting, to a UE, information identifying an SPS configuration for a broadcast/multicast communication (block 510). For example, the base station (e.g., using transmit processor 220, receive processor 238, controller/processor 240, memory 242, and/or the like) may transmit, to a UE, information identifying an SPS configuration for a broadcast/multicast communication, as described above.

As further shown in FIG. 5, in some aspects, process 500 may include transmitting the broadcast/multicast communication in accordance with the SPS configuration (block 520). For example, the base station (e.g., using transmit processor 220, receive processor 238, controller/processor 240, memory 242, and/or the like) may transmit the broadcast/multicast communication in accordance with the SPS configuration, as described above.

Process 500 may include additional aspects, such as any single implementation or any combination of aspects described below and/or in connection with one or more other processes described elsewhere herein.

In a first aspect, the SPS configuration is cell-specific.

In a second aspect, alone or in combination with the first aspect, the UE is associated with a cell provided by the base station. In some aspects, the SPS configuration is used for UEs of the cell.

In a third aspect, alone or in combination with one or more of the first aspect and/or the second aspect, the SPS configuration indicates at least one of a periodicity of the broadcast/multicast communication, a modulation and coding scheme of the broadcast/multicast communication, a precoding matrix index of the broadcast/multicast communication, or a number of hybrid automatic repeat request processes of the broadcast/multicast communication.

In a fourth aspect, alone or in combination with one or more of the first through third aspects, the SPS configuration indicates a resource or a beam for the broadcast/multicast communication or for an acknowledgment or a negative acknowledgment for the broadcast/multicast communication.

In a fifth aspect, alone or in combination with one or more of the first through fourth aspects, the SPS configuration indicates a common DCI or MAC CE for activation, deactivation, reconfiguration, or retransmission of the broadcast/multicast communication.

In a sixth aspect, alone or in combination with one or more of the first through fifth aspects, the SPS configuration indicates a common RNTI to be used to scramble the common DCI.

In a seventh aspect, alone or in combination with one or more of the first through sixth aspects, the SPS configuration indicates a common control resource set or a common search space for the common DCI.

In an eighth aspect, alone or in combination with one or more of the first through seventh aspects, the SPS configuration is communicated using RRC messaging or a SIB broadcast.

In a ninth aspect, alone or in combination with one or more of the first through eighth aspects, the base station may transmit broadcast/multicast signaling regarding the SPS configuration, wherein the broadcast/multicast signaling indicates to activate, deactivate, or reconfigure the broadcast/multicast communication.

In a tenth aspect, alone or in combination with one or more of the first through ninth aspects, the broadcast/multicast signaling is scrambled using a radio network temporary identifier associated with a group of UEs that includes the UE.

In an eleventh aspect, alone or in combination with one or more of the first through tenth aspects, the base station may receive feedback regarding the broadcast/multicast communication.

In a twelfth aspect, alone or in combination with one or more of the first through eleventh aspects, the feedback is received on a common resource for a group of UEs that includes the UE.

In a thirteenth aspect, alone or in combination with one or more of the first through twelfth aspects, the feedback is received on a resource specific to the UE.

In a fourteenth aspect, alone or in combination with one or more of the first through thirteenth aspects, the feedback uses a same physical sequence for each UE of a group of UEs that includes the UE.

In a fifteenth aspect, alone or in combination with one or more of the first through fourteenth aspects, the base station may retransmit the broadcast/multicast communication based at least in part on the feedback.

In a sixteenth aspect, alone or in combination with one or more of the first through fifteenth aspects, the broadcast/multicast communication is retransmitted in a next SPS allocation.

In a seventeenth aspect, alone or in combination with one or more of the first through sixteenth aspects, the feedback includes negative feedback from one or more UEs, wherein the broadcast/multicast communication is retransmitted for the one or more UEs using a dynamically scheduled resource that is scheduled using dedicated downlink control information.

In an eighteenth aspect, alone or in combination with one or more of the first through seventeenth aspects, the SPS configuration is UE-specific.

In a nineteenth aspect, alone or in combination with one or more of the first through eighteenth aspects, the SPS configuration is communicated using dedicated downlink control information, a dedicated MAC CE, or a dedicated RRC message.

In a twentieth aspect, alone or in combination with one or more of the first through nineteenth aspects, the SPS configuration for multiple UEs uses a same downlink reception parameter for the multiple UEs.

In a twenty-first aspect, alone or in combination with one or more of the first through twentieth aspects, the SPS configuration identifies an uplink feedback configuration that is UE-specific.

In a twenty-second aspect, alone or in combination with one or more of the first through twenty-first aspects, the base station may receive unicast signaling regarding the SPS configuration, wherein the unicast signaling indicates to activate, deactivate, or reconfigure the broadcast/multicast communication.

In a twenty-third aspect, alone or in combination with one or more of the first through twenty-second aspects, the unicast signaling is scrambled using a dedicated radio network temporary identifier of the UE.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    receiving information identifying a semi-persistent scheduling (SPS) configuration for a broadcast or multicast (broadcast/multicast) communication, wherein the SPS configuration indicates a precoding matrix index of the broadcast/multicast communication;
    receiving signaling regarding the SPS configuration, wherein the signaling indicates to activate, deactivate, or reconfigure the broadcast/multicast communication, and wherein the signaling is scrambled; and
    receiving the broadcast/multicast communication in accordance with the SPS configuration.

2. The method of claim 1, wherein the SPS configuration is cell-specific.

3. The method of claim 1, wherein the UE is associated with a cell, and wherein the SPS configuration is used for UEs of the cell.

4. The method of claim 1, wherein the SPS configuration further indicates at least one of:
    a periodicity of the broadcast/multicast communication,
    a modulation and coding scheme of the broadcast/multicast communication, or
    a number of hybrid automatic repeat request processes of the broadcast/multicast communication.

5. The method of claim 1, wherein the SPS configuration further indicates a resource or a beam for at least one of:
    the broadcast/multicast communication, or
    an acknowledgment or a negative acknowledgment for the broadcast/multicast communication.

6. The method of claim 1, wherein the SPS configuration further indicates a common downlink control information (DCI) or media access control (MAC) control element (CE) for activation, deactivation, reconfiguration, or retransmission of the broadcast/multicast communication.

7. The method of claim 6, wherein the SPS configuration further indicates a common radio network temporary identifier (RNTI) to be used to scramble the common DCI.

8. The method of claim 6, wherein the SPS configuration further indicates a common control resource set or a search space for the common DCI.

9. The method of claim 1,
    wherein the signaling is broadcast/multicast signaling, and
    wherein the broadcast/multicast signaling is scrambled using a radio network temporary identifier associated with a group of UEs that includes the UE.

10. The method of claim 1, further comprising:
    transmitting an acknowledgment (ACK) or a negative ACK (NACK) for the broadcast/multicast communication, wherein the ACK or the NACK uses a same physical sequence for each UE of a group of UEs that includes the UE.

11. The method of claim 1, wherein the SPS configuration identifies an uplink feedback configuration that is cell-specific.

12. The method of claim 1, wherein the SPS configuration is UE-specific.

13. The method of claim 1, wherein the SPS configuration for multiple UEs uses a same downlink reception parameter for the multiple UEs.

14. The method of claim 1, wherein the SPS configuration identifies an uplink feedback configuration that is UE-specific.

15. The method of claim 1,
    wherein the signaling is unicast signaling, and
    wherein the unicast signaling is scrambled using a dedicated radio network temporary identifier of the UE.

16. A method of wireless communication performed by a base station (BS), comprising:
    transmitting, to a user equipment (UE), information identifying a semi-persistent scheduling (SPS) configuration for a broadcast or multicast (broadcast/multicast) communication, wherein the SPS configuration indicates a precoding matrix index of the broadcast/multicast communication;

transmitting signaling regarding the SPS configuration, wherein the signaling indicates to activate, deactivate, or reconfigure the broadcast/multicast communication, and wherein the signaling is scrambled; and transmitting the broadcast/multicast communication in accordance with the SPS configuration.

17. The method of claim 16, wherein the SPS configuration is cell-specific.

18. The method of claim 16, wherein the SPS configuration indicates at least one of:
 a periodicity of the broadcast/multicast communication,
 a modulation and coding scheme of the broadcast/multicast communication, or
 a number of hybrid automatic repeat request processes of the broadcast/multicast communication.

19. The method of claim 16, wherein the SPS configuration further indicates a resource or a beam for at least one of:
 the broadcast/multicast communication, or
 an acknowledgment or a negative acknowledgment for the broadcast/multicast communication.

20. The method of claim 16, wherein the SPS configuration further indicates a common downlink control information (DCI) or media access control (MAC) control element (CE) for activation, deactivation, reconfiguration, or retransmission of the broadcast/multicast communication.

21. The method of claim 20, wherein the SPS configuration further indicates a common radio network temporary identifier (RNTI) to be used to scramble the common DCI.

22. The method of claim 20, wherein the SPS configuration further indicates a common control resource set or a common search space for the common DCI.

23. The method of claim 16,
 wherein the signaling broadcast/multicast signaling, and
 wherein the broadcast/multicast signaling is scrambled using a radio network temporary identifier associated with a group of UEs that includes the UE.

24. The method of claim 16, further comprising:
 receiving feedback regarding the broadcast/multicast communication; and
 retransmitting the broadcast/multicast communication based at least in part on the feedback.

25. The method of claim 24, wherein the feedback is received on a common resource for a group of UEs that includes the UE.

26. The method of claim 24, wherein the feedback is received on a resource specific to the UE.

27. The method of claim 24, wherein the feedback uses a same physical sequence for each UE of a group of UEs that includes the UE.

28. The method of claim 24, wherein the broadcast/multicast communication is retransmitted in a next SPS allocation.

29. The method of claim 24, wherein the feedback includes negative feedback from one or more UEs, and wherein the broadcast/multicast communication is retransmitted for the one or more UEs using a dynamically scheduled resource that is scheduled using dedicated downlink control information.

30. The method of claim 16, wherein the SPS configuration for multiple UEs uses a same downlink reception parameter for the multiple UEs.

* * * * *